US009038150B2

United States Patent
Kodama

(10) Patent No.: US 9,038,150 B2
(45) Date of Patent: May 19, 2015

(54) PROVISIONING DEVICE FOR PERFORMING PROVISIONING OF A FIELD DEVICE

(75) Inventor: Kazutoshi Kodama, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/206,048

(22) Filed: Aug. 9, 2011

(65) Prior Publication Data

US 2012/0036568 A1 Feb. 9, 2012

(30) Foreign Application Priority Data

Aug. 9, 2010 (JP) .................................. 2010-178619

(51) Int. Cl.
*H04L 29/06* (2006.01)
*G05B 19/042* (2006.01)
*H04W 12/06* (2009.01)
*H04W 4/00* (2009.01)
*H04W 8/26* (2009.01)
*H04W 12/04* (2009.01)

(52) U.S. Cl.
CPC ............ *G05B 19/0423* (2013.01); *H04L 63/12* (2013.01); *H04L 63/065* (2013.01); *H04W 8/265* (2013.01); *H04W 12/06* (2013.01); *H04W 4/001* (2013.01); *H04W 12/04* (2013.01)

(58) Field of Classification Search
CPC ....................................................... H04L 63/12
USPC ................................................ 726/7; 709/217
See application file for complete search history.

(56) References Cited

U.S. PATENT DOCUMENTS

| | | | | |
|---|---|---|---|---|
| 6,618,630 | B1 * | 9/2003 | Jundt et al. ...................... | 700/17 |
| 7,933,594 | B2 * | 4/2011 | Nixon et al. .................. | 455/428 |
| 8,144,622 | B2 * | 3/2012 | Shepard et al. ............... | 370/254 |
| 8,229,576 | B2 * | 7/2012 | Kodama et al. ................. | 700/17 |
| 8,522,312 | B2 * | 8/2013 | Huber et al. ...................... | 726/3 |

(Continued)

FOREIGN PATENT DOCUMENTS

| | | |
|---|---|---|
| JP | 2005-51746 A | 2/2005 |
| JP | 2009-145934 A | 7/2009 |
| JP | 2009-284183 A | 12/2009 |

OTHER PUBLICATIONS

Hart Communication Foundation "Control with WirelessHart", http://www.hartcomm.org; pp. 1-9.

(Continued)

*Primary Examiner* — Longbit Chai
(74) *Attorney, Agent, or Firm* — Westerman, Hattori, Daniels & Adrian, LLP

(57) ABSTRACT

There is provided a provisioning device which provides, in advance, setting information necessary for joining in a wireless network to a first field device which is to newly join the wireless network to exchange data with an existing field device that is installed in a plant. The provisioning device includes: a storage unit that stores a white list which contains unique information of the first field device and the setting information such that the unique information and the setting information are correlated with each other; a device information acquiring unit that acquires the unique information from the first field device by wireless communication; an extracting unit that extracts, from the white list, the setting information that is correlated with the acquired unique information; and a setting unit that sends the extracted setting information to the first field device by wireless communication.

8 Claims, 5 Drawing Sheets

(56) References Cited

U.S. PATENT DOCUMENTS

| | | | |
|---|---|---|---|
| 8,613,042 B2* | 12/2013 | Ishikawa | 726/1 |
| 2002/0169977 A1* | 11/2002 | Chmaytelli | 713/200 |
| 2004/0073604 A1* | 4/2004 | Moriya et al. | 709/202 |
| 2004/0203434 A1* | 10/2004 | Karschnia et al. | 455/67.11 |
| 2004/0203863 A1* | 10/2004 | Huomo | 455/456.1 |
| 2004/0259533 A1* | 12/2004 | Nixon et al. | 455/414.1 |
| 2008/0082698 A1 | 4/2008 | Schnaare | |
| 2008/0250162 A1* | 10/2008 | Nixon et al. | 710/10 |
| 2009/0132816 A1* | 5/2009 | Lee | 713/164 |
| 2009/0147784 A1* | 6/2009 | Miyazawa | 370/390 |
| 2009/0222242 A1* | 9/2009 | Kodama | 702/188 |
| 2009/0292915 A1* | 11/2009 | Sakane | 713/155 |
| 2009/0296601 A1 | 12/2009 | Citrano, III et al. | |
| 2010/0023140 A1* | 1/2010 | Kodama et al. | 700/83 |
| 2011/0302635 A1* | 12/2011 | Pratt et al. | 726/4 |
| 2011/0321123 A1* | 12/2011 | Ishikawa | 726/1 |
| 2012/0036568 A1* | 2/2012 | Kodama | 726/7 |
| 2012/0253941 A1* | 10/2012 | van Bemmel | 705/14.66 |

OTHER PUBLICATIONS

ISA-100.11a-2009, An ISA Standard, "Wireless systems for industrial automation: Process control and related applications", pp. 1-817.

Extended European Search Report dated Jul. 25, 2012, issued in corresponding European Patent Application No. 11176722.4 (5 pages).

Hart Communication Foundation "Control with WirelessHart", http://www.hartcomm.org; pp. 1-9, 2009 (cited in Specification).

* cited by examiner

*FIG. 2*

| Device Tag | Device EUI64 | Vendor | Device Type | Network ID | Security Manager EUI64 | Status |
|---|---|---|---|---|---|---|
| PT1001 | XXXX:XXXX:XXXX:XXXX | Yokogawa | EJX | 100 | AAAA:AAAA:AAAA:AAAA | Not yet |
| FIC100 | YYYY:YYYY:YYYY:YYYY | Yokogawa | YTA | 101 | BBBB:BBBB:BBBB:BBBB | Done |

PROVISIONING DEVICE FOR PERFORMING PROVISIONING OF A FIELD DEVICE

This application claims priority from Japanese Patent Application No. 2010-178619, filed on Aug. 9, 2010, the entire contents of which are herein incorporated by reference.

BACKGROUND

1. Technical Field

The present invention relates to a provisioning device which is provided in a plant and performs provisioning for setting, in advance, in a field device to newly join a wireless network that serves for exchange of data with field devices, information that are necessary for joining of the field device. The present invention relates to a provisioning device capable of performing provisioning for a field device reliably and efficiently.

2. Related Art

Conventionally, in a trial run of field devices which are cable-connected to a distributed control system and analog transmission as typified by a type using an 4 to 20 mA analog signal or digital transmission used in a specification of the field bus association, the field devices are adjusted and checked (pre-installation checks) before they are connected and final checks such as feedback control loop checks of PID control are performed (called commissioning) after they are connected.

Various kinds of field devices such as a differential pressure gauge, a flowmeter, a thermometer, a monitoring camera, an actuator, and a controller are installed in plants.

Nowadays, techniques that make it possible to use wireless transmission lines in a case that wired transmission lines would be used conventionally are being established in the process control field. In particular, a configuration with wireless connections in which field devices are connected by a wireless transmission scheme as typified by the ISA 100.11a standard is being studied.

For example, it is proposed to configure a process control system of industrial automation utilizing a wireless control network system (hereinafter referred to as a wireless network) that is provided with field devices.

This is to solve a problem the control accuracy of conventional control systems is lowered because sensors for measuring temperatures, flow rates, etc. cannot be installed at optimum positions in a plant because of limitations of communication distances, restrictions relating to wiring, and other reasons which result from the fact that the conventional control systems employ wired networks.

To newly add a field device to a wireless network, work (called provisioning) of setting security information and network information in the field device in advance is necessary.

The provisioning is an act of setting, in advance, in a field device, information (security information and network information) that are necessary for joining the field device in a wireless network so as to prevent illegal access by a third person for falsification of data, masquerading, etc.

A field device in which no such setting information is set or such setting information are set erroneously cannot join a wireless network.

Security information includes a join key. Network information is information that is necessary for joining of a field device in a wireless network.

The wireless communication standards for a wireless network that are under examination are WirelessHART which is prescribed in HART (Highway Addressable Remote Transducer) 7 and the process control wireless communication standard ISA 100.11a which was approved by the ISA 100 committee of ISA (International Society of Automation).

WirelessHART and ISA 100.11a are industrial wireless communication protocols/standards for frequency division communication, the details of which are described in the following documents, for example:

Document 1: "Wireless systems for industrial automation: Process control and related applications"

Document 2: "Control with WirelessHART"(URL: http://www.hartcomm.org/protocol/training/resources/wiHART_resources/Control_with_WirelessHART.pdf)

A device which performs provisioning for a field device is called a provisioning device. A conventional provisioning device will be described below.

FIG. 4 is a block diagram showing functions of an example conventional provisioning device.

The provisioning device 1 is a device for performing provisioning on field devices 2-4, and includes: a receiver 11 such as a keyboard and a mouse for receiving an operation from a user who performs provisioning operation for the field devices 2-4; a wireless communication unit 12 for exchanging data with the field devices 2-4 by wireless communication such as infrared communication; a device information acquiring unit 13 for acquiring unique information (device tag, device EUI64, vendor ID, and device type) from each of the field devices 2-4 by wireless communication; a display unit 14 for displaying an operation screen for provisioning and the acquired unique information of each of the field devices 2-4; and a computation controller 15 for controlling the individual units to perform a provisioning operation.

The device EUI64 is an identifier for identification of a field device, "EUI64" being an abbreviation of "64-bit extended unique identifier."

The field devices 2-4 are field devices that are installed in a plant, for example, and are to be newly added to a wireless network that involves field devices that exchange data by wireless communication.

In the following, a user who performs provisioning for the field devices 2-4 by operating the provisioning device 1 will be referred to as a field worker.

A field worker has a white list in which the unique information of the field devices 2-4 and data for provisioning of the field devices 2-4 (hereinafter referred to as "provisioning data") are correlated with each other in advance. In other words, the white list is a correspondence table containing the unique information of the field devices 2-4 and the provisioning data.

For example, each set of provisioning data contained in the white list includes a network ID of the wireless network to which the field devices 2-4 are to be added, a device address, on the wireless network, of a system manager apparatus (not shown) to which a joining request is sent in adding each of the field device 2-4 to the wireless network, and a join key which is used for authentication in adding each of the field devices 2-4 to the wireless network.

The white list may be any of a database, electronic data in text form, and information written on a sheet as long as it correlates the unique information and the provisioning data.

As described above, the conventional provisioning device 1 operates in the following manner FIG. 5 illustrates how the conventional provisioning device 1 operates.

At step SP101, a field worker inputs information (e.g., device tag and network ID) for identification of a provisioning subject field device (e.g., field device 2) through the receiver 11 into an input area of the operation screen displayed on the display unit 14.

In other words, the provisioning device 1 receives the information (e.g., device tag and network ID) for identification of the provisioning subject field device 2 through the receiver 11.

At step SP102, the device information acquiring unit 13 controls the wireless communication unit 12 and thus sends, to the field device 2, by wireless communication (e.g., infrared communication), a request signal for requesting transmission of the unique information of the field device 2.

Receiving the request signal, at step SP103 the field device 2 sends the unique information by wireless communication (e.g., infrared communication).

In the provisioning device 1, when receiving the unique information of the field device 2 through the wireless communication unit 12, at step SP104 the computation controller 16 displays the unique information of the field device 2 on the display unit 14.

At step SP105, the field worker extracts the provisioning data to be set in the field device 2 from the white list based on particular information (e.g., information that are readable but not writable such as the device EUI64, vendor ID, and device type) among the unique information of the field device 2 being displayed on the display unit 14.

At step SP106, the field worker inputs the extracted provisioning data through the receiver 11.

In other words, the provisioning data for the field device 3 that have been extracted by the field worker are input to the provisioning device 1 through the receiver 11.

At step SP107, the computation controller 16 of the provisioning device 1 sends the provisioning data received through the receiver 11 to the field device 2 through the wireless communication unit 12.

At step SP108, a computation controller (not shown) of the field device 2 sets the network ID, the device address, on the wireless network, of the system manager apparatus, and the join key based on the received provisioning data and stores them in a storage unit (not shown).

At step SP109, the computation controller of the field device 2 sends currently set information to the provisioning device 1 by wireless communication.

At step SP110, the provisioning device 1 receives the currently set information from the field device 2 through the wireless communication unit 12 and displays them on the display unit 14.

At step SP111, the field worker visually compares the information that are currently set in the field device 2 and displayed on the display unit 14 with the provisioning data to be set in the field device 2 that are contained in the white list, and determines whether the two sets of information are identical or not. If they are identical, the field worker determines that the provisioning data have been set normally. The provisioning work for the field device 2 is thus finished.

Upon the completion of the provisioning for the field device 2, provisioning for the field device 3 is performed. Upon completion of the provisioning for the field device 3, provisioning for the field device 4 is performed.

The provisioning work for each of the field devices 3 and 4 is the same as the above-described operation (SP101-SP111) and hence will not be described below.

As described above, in the conventional provisioning device 1, provisioning data that are contained in the white list in advance and input by a field worker are transmitted to a field device by wireless communication. The field device performs setting based on the received provisioning data. As a result, the field device can newly join a wireless network without risk of illegal access for falsification of data, masquerading, or the like.

For example, JP-A-2009-145934 relates to a provisioning device and discloses a technique for visually checking an inside state of a pipe using a capsule imaging device.

However, the conventional provisioning device 1 has a problem that a human error such as an erroneous input tends to occur, because a field worker inputs setting information based on provisioning data that are extracted from the white list. This results in a problem that if setting information erroneously that was input erroneously due to a human error is kept set in a field device, the field device cannot join the wireless network.

There is another problem that since many types of field device are installed in a large number in a plant, an error tends to occur in extracting proper provisioning data from the white list or inputting proper provisioning data, in which case the provisioning cannot be performed properly.

Whereas a large number of field devices are installed in a plant, with the conventional provisioning device 1 provisioning work is performed for only one field device at a time. This means a problem that the work efficiency is low.

Provisioning data include data that is important in terms of security. However, in a situation that as with the conventional provisioning device 1 a field worker carries the white list, the field worker may, for example, lose the white list (human error) or be robbed of it. A malicious third person who has acquired the white list may use it to, for example, access the wireless network illegally. This means a problem that a fatal security hole may be produced.

SUMMARY OF THE INVENTION

An object of the present invention is to provide a provisioning device capable of performing provisioning for a field device reliably and efficiently.

According to a first aspect of the present invention, there is provided a provisioning device which provides, in advance, setting information necessary for joining in a wireless network to a first field device which is to newly join the wireless network to exchange data with an existing field device that is installed in a plant. The provisioning device includes: a storage unit that stores a white list which contains unique information of the first field device and the setting information such that the unique information and the setting information are correlated with each other; a device information acquiring unit that acquires the unique information from the first field device by wireless communication; an extracting unit that extracts, from the white list, the setting information that is correlated with the acquired unique information; and a setting unit that sends the extracted setting information to the first field device by wireless communication.

Other aspects and advantages of the present invention will be apparent from the following description, the drawings and the claims.

BRIEF DESCRIPTION OF THE DRAWINGS

FIG. 2 shows an example white list shown in FIG. 1;

DETAILED DESCRIPTION OF THE EXEMPLARY EMBODIMENTS

First Embodiment

The present invention will be hereinafter described in detail with reference to the drawings.

Figure 1:
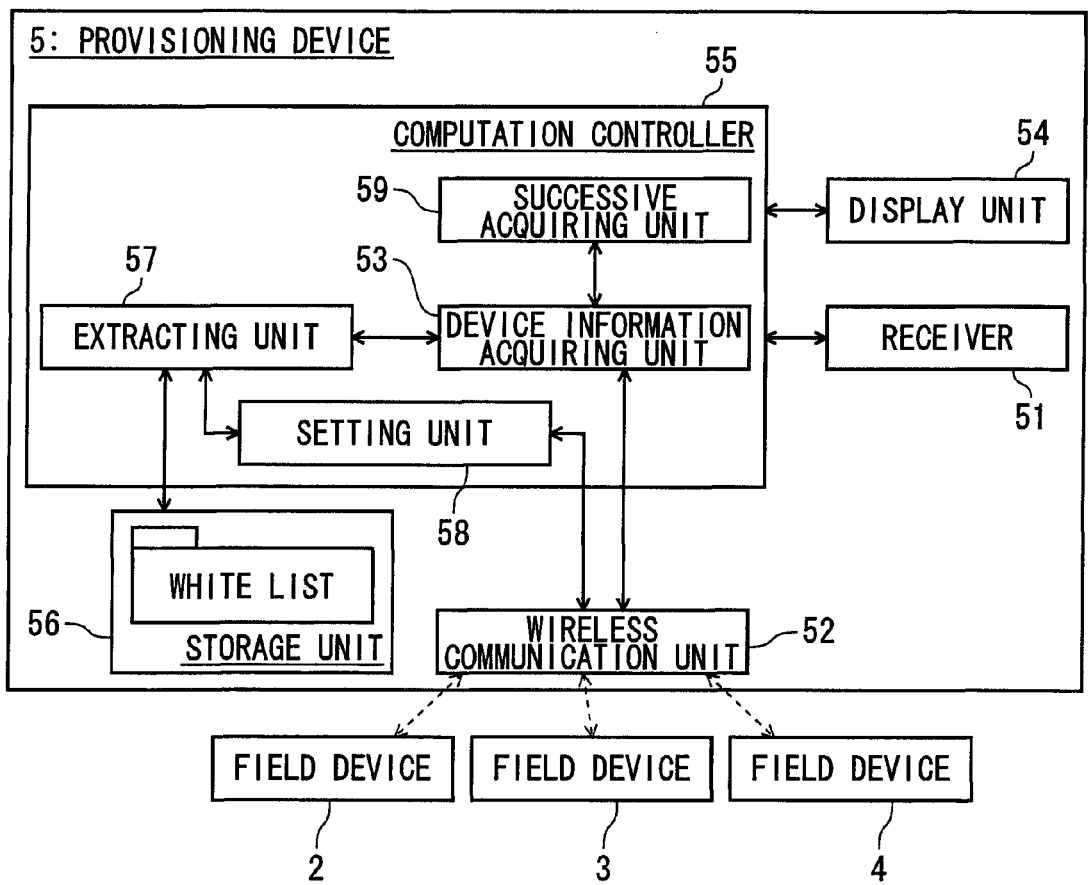
FIG. 1 is a block diagram showing the configuration of a provisioning device according to an embodiment of the present invention.

FIG. 1 shows the configuration of a provisioning device according to an embodiment of the invention. The same references will be assigned to units common to ones in FIG. 4, and the description thereof will be omitted appropriately.

Figure 4:
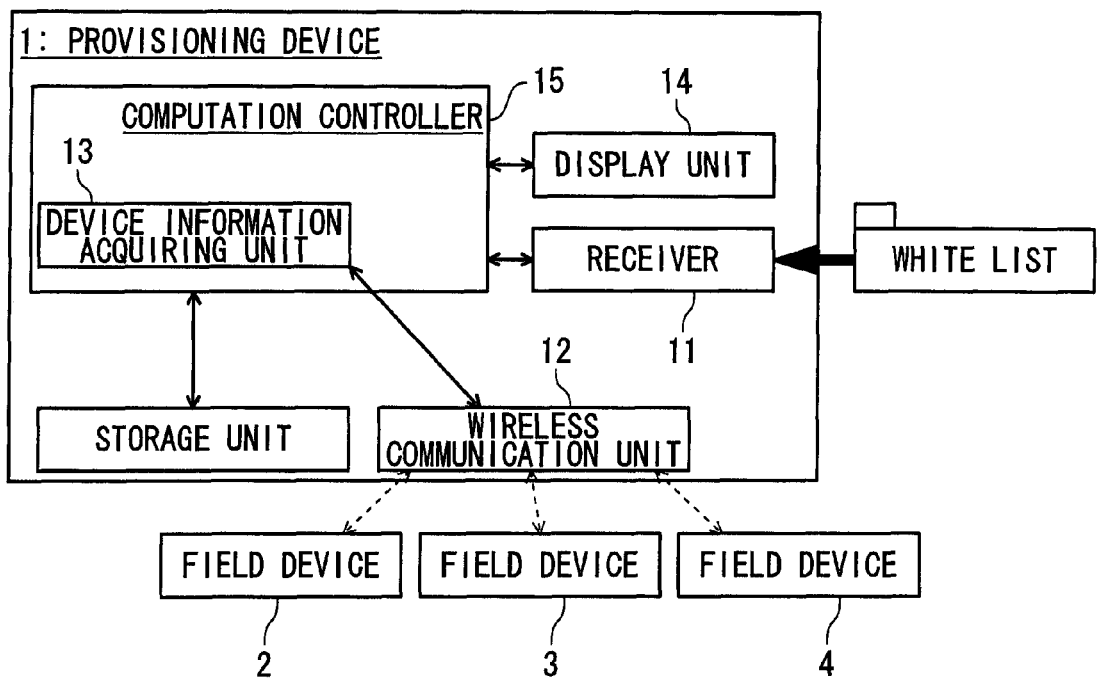
FIG. 4 is a block diagram showing functions of an example conventional provisioning device.
Figure 5:
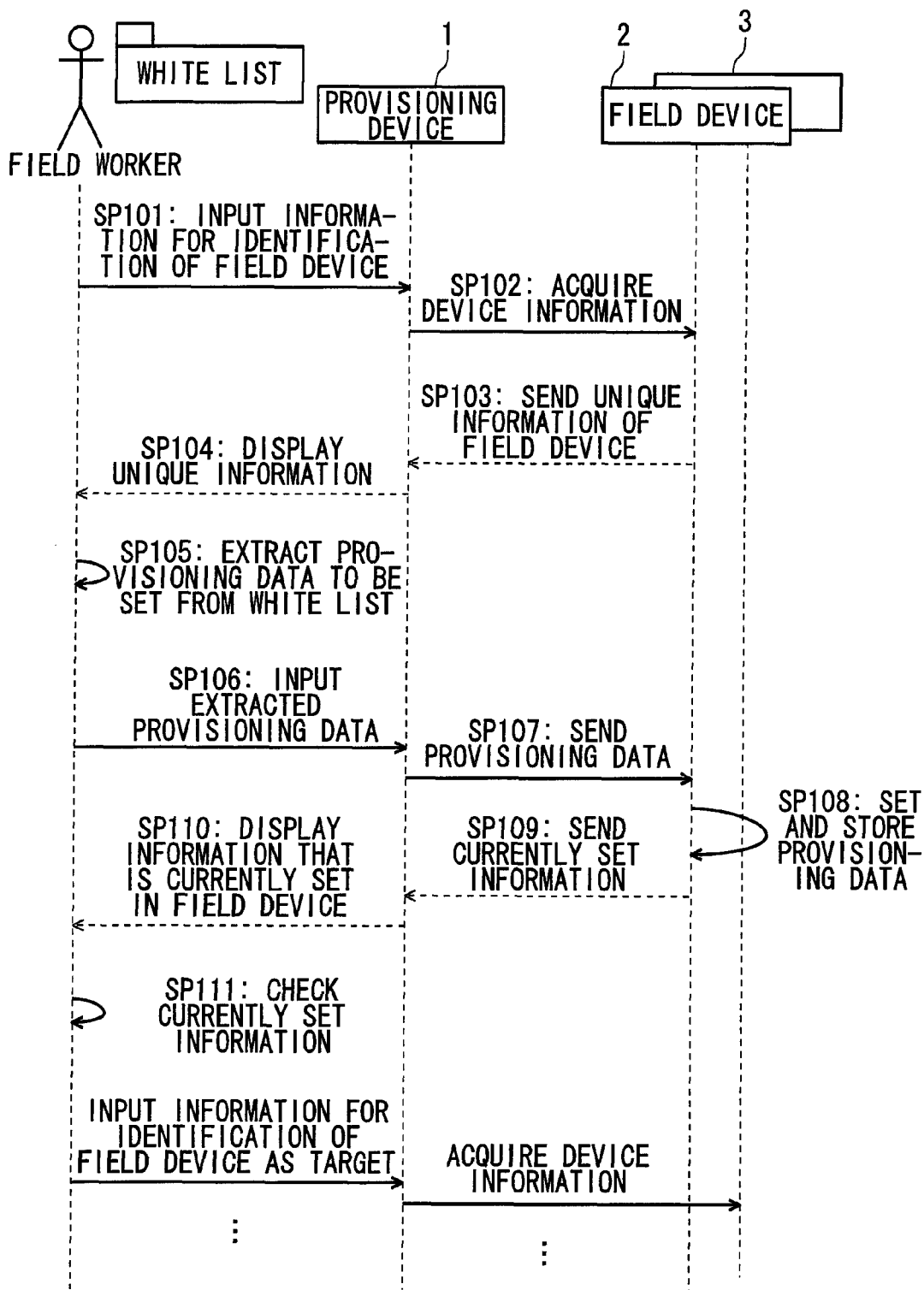
FIG. 5 illustrates how the conventional provisioning device operates.

The provisioning device 5 of FIG. 1 is different from the provisioning device 1 of FIG. 4 as follows. That is, the provisioning device 5 of FIG. 1 includes: a storage unit for storing a white list in which unique information of field devices to be newly added to a wireless network and setting information for provisioning of the field devices are correlated with each other; a device information acquiring unit that acquires the unique information from the first field device by wireless communication; an extracting unit for extracting, from the white list, setting information that are correlated with unique information acquired from a field device; and a setting unit for sending the extracted setting information to the field device by wireless communication. Also, the provisioning device 5 of FIG. 1 is portable and performs provisioning for the plural field devices successively.

The provisioning device of FIG. 1 is also different from the provisioning device 1 of FIG. 4 as follows. That is, the provisioning device of FIG. 1 includes: a successive acquiring unit for acquiring unique information successively from the field devices to be newly added by controlling the device information acquiring unit so that it continues to output unique information request signals, after a start of provisioning for the field devices.

(General Configuration)

As shown in FIG. 1, the provisioning device 5 mainly includes receiver 51, such as a keyboard, a mouse, and an interface to interface with an external storage medium, for receiving (an input signal representing) a white list to be used for provisioning of field devices 2-4 to be added to a wireless network, a wireless communication unit 52 for exchanging data with the field devices 2-4 by wireless communication such as infrared communication, the device information acquiring unit 53 for acquiring unique information (device tag, device identification information (device EUI64), vendor ID, and device type) from each of the field devices 2-4 by wireless communication, a display unit 54 for displaying a operation picture for provisioning (i.e., a picture for input of the white list) and the acquired unique information of each of the field devices 2-4, a computation controller 55 for controlling the individual units to perform a provisioning operation, and the storage unit 56 for storing the input white list.

The device information acquiring unit 53 controls the wireless communication unit 52 and thereby sends request signals for acquisition of unique information to the field devices 2-4 by wireless communication (e.g., infrared communication). Upon reception of the request signal, one of the field devices 2-4 sends unique information to the provisioning device 5 by wireless communication.

The provisioning device 5 includes the extracting unit 57 for extracting, from the white list, setting information that are correlated with unique information acquired from one of the field devices 2-4 by the device information acquiring unit 53, the setting unit 58 for sending the extracted setting information to the one of the field devices 2-4 by wireless communication, and the successive acquiring unit 59 for controlling the device information acquiring unit 53 so that it continues to output unique information request signals (for example, until completion of provisioning for all the field devices 2-4) to acquire unique information from the field devices 2-4, after a start of provisioning for the field devices 2-4.

The provisioning device 5 may be a handy terminal that is roughly the same, in size and weight, as a pocket calculator.

The field devices 2-4 are field devices that are installed in a plant, for example, and are to be newly added to a wireless network that involves field devices that exchange data by wireless communication. Each of the field devices 2-4 includes a wireless communication unit for exchanging data by infrared communication, for example.

The white list is electronic data in the CSV, TSV, or XML format or the like, and contains unique information of the field devices 2-4 and setting information for provisioning of the field devices 2-4 such that they are correlated with each other.

For example, each of provisioning data contained in the white list includes a network ID of the wireless network to which the field devices 2-4 are to be added, a device address, on the wireless network, of a system manager apparatus (not shown) to which a joining request is sent in adding each of the field device 2-4 to the wireless network, and a join key which is used for authentication in adding each of the field devices 2-4 to the wireless network.

FIG. 2 shows an example white list shown in FIG. 1. As shown in FIG. 2, each list item of the white list consists of pieces of device unique information that are a device tag, device identification information (device EUI64), a vendor ID, and a device type, provisioning data that are a network ID, and identification information of a security manager apparatus (security manager EIU64), and management data that is status information.

The device tag is a logical name of the field device and indicates its type and position in a plant. For example, in the case of "PT1001" shown in FIG. 2, "PT" means a differential pressure/pressure transmitter and "1001" indicates a position in the plant. In the case of "FIC100," "FIC" means a temperature transmitter and "100" indicates a position in the plant.

The computation controller 55, which is a CPU, for example, controls the entire provisioning device 5 by controlling the functions of the individual units. The computation controller 55 mainly controls the individual functional blocks such as the device information acquiring unit 53, the extracting unit 57, the setting unit 58, and the successive acquiring unit 59. These may be independent devices that are connected to each other by a bus.

The computation controller 55 performs a provisioning operation by controlling the individual units or the entire provisioning device 5 by activating an OS stored in the storage unit 56 and reading and running, on the OS, programs stored in the storage unit 56.

The storage unit 56 may be such as to develop, in a program storage area, programs and an application to be run by the computation controller 55 and to temporarily store, in a work area, input data and such data as processing results that are produced when the programs and the application are run.

(Workings)

Figure 3:
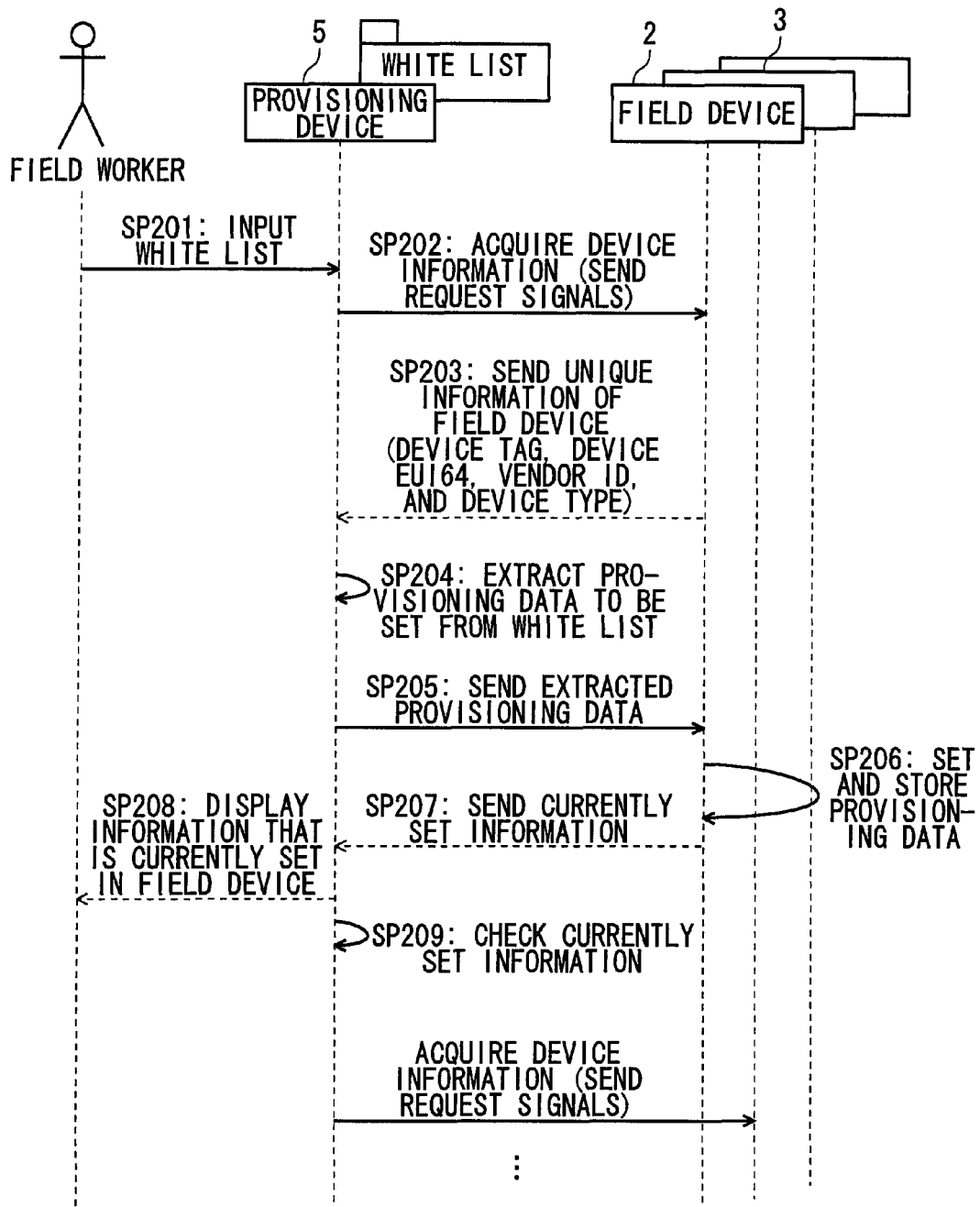
FIG. 3 illustrates how the conventional provisioning device of FIG. 1 operates.

With the above configuration, the provisioning device 5 according to the embodiment operates in the following manner FIG. 3 illustrates how the provisioning device 5 of FIG. 1 operates.

In the following, a user who performs provisioning for the field devices 2-4 by operating the provisioning device 5 will be referred to as a field worker. Also, in the present embodiment, the user is not limited to the field worker. For example, the user may be a plant manager instead of the filed worker.

A field worker has the white list in which the unique information of the field devices 2-4 and the provisioning data of the field devices 2-4 are correlated with each other in advance. In other words, the white list is a correspondence table containing the unique information of the field devices 2-4 and the sets of provisioning data.

At step SP201, a field worker inputs the white list to the provisioning device 5 through the receiver 11. The provisioning device 5 stores the input white list in the storage unit 55.

For example, the white list is stored in an external storage medium such as a USB memory and input to the provisioning device 5 when the external storage medium is electrically connected to the receiver 51.

At step SP202, the successive acquiring unit 59 of the provisioning device 5 controls the device information acquiring unit 53 to output request signals for acquisition of unique information until provisioning for all the field devices 2-4 is finished.

That is, the successive acquiring unit 59 controls the device information acquiring unit 53 so that it continues to send request signals for acquisition of unique information by infrared communication until provisioning for all the field devices 2-4 on the white list is finished.

To perform provisioning, the field worker who is carrying the provisioning device 5 goes round places (in a maintenance room) where plural field devices are placed temporarily. During the round, the successive acquiring unit 59 controls the device information acquiring unit 53 so that it continues to output request signals.

At step SP203, when the field device 2 receives the request signals, the field device sends the unique information to the provisioning device 5 by wireless communication (e.g., infrared communication).

For example, a field device 2 that is the closest to the interface of the wireless communication unit 52 of the provisioning device 5 carried by the field worker receives the request signal and sends the unique information to the provisioning device 5 by wireless communication (infrared communication).

At step SP204, the provisioning device 5 receives the unique information from the field device 2 through the wireless communication unit 52 and the extracting unit 57 extracts the provisioning data (setting information) to be set in the field device 2 from the white list stored in the storage unit 56 based on particular information (e.g., information that are readable but not writable such as the device EUI64, vendor ID, and device type) among the received unique information.

At step SP205, the setting unit 58 of the provisioning device 5 sends the provisioning data (setting information) extracted by the extracting unit 57 to the field device 2 through the wireless communication unit 52.

At step SP206, a computation controller (not shown) of the field device 2 sets the network ID, the device address, on the wireless network, of the system manager device, and the join key based on the received provisioning data and stores them in a storage unit (not shown).

The system manager device (not shown) is installed in the wireless network and manages a schedule of the wireless network and, for example, connection and addition of the field devices 2-4 to the wireless network.

At step SP207, the computation controller of the field device 2 sends currently set information to the provisioning device 5 by wireless communication.

At step SP208, the provisioning device 5 receives the currently set information from the field device 2 through the wireless communication unit 52 and displays them on the display unit 54.

At step SP209, the provisioning device 5 compares the information that are currently set in the field device 2 and displayed on the display unit 54 with the provisioning data to be set in the field device 2 that are contained in the white list, and determines whether the two sets of information are identical or not. If they are identical, the field worker determines that the provisioning data have been set normally. The provisioning operation for the field device 2 is thus finished.

The provisioning device 5 performs provisioning for all of the field devise 2-4 by performing the above-described provisioning operation.

More specifically, upon the completion of the provisioning for the field device 2, the field worker continues to go round the maintenance room and reaches a place where the other field devices 3 and 4 may be placed temporarily.

After the movement, a field device (field device 2 or 3) that is the closest to the provisioning device 5 receives the request signal. Then, provisioning (operations at steps S202-S209) are executed for the field device 3-4.

The above-described operation is performed repeatedly, whereby provisioning for all of the field devise 2-4 is performed.

The provisioning operation for each of the field devices 3 and 4 is the same as the above-described operation (SP202-SP209) and hence will not be described any further below.

For this reason, the provisioning device according to the present invention includes: the storage unit for storing a white list in which unique information of field devices to be newly added to a wireless network and setting information for provisioning of the field devices are correlated with each other; device information acquiring unit that acquires the unique information from the first field device by wireless communication; the extracting unit for extracting, from the white list, setting information that are correlated with unique information acquired from a field device; and the setting unit 58 for sending the extracted setting information to the field device by wireless communication. Therefore, the provisioning device can perform provisioning reliably.

That is, in the provisioning device according to the present invention, the white list is stored in the storage unit 56 in advance, the extracting unit extracts proper provisioning data to be set in a field device, and the setting unit sends the extracted provisioning data to the field device. As a result, unlike in the conventional case, an event can be prevented that a field worker extracts provisioning data erroneously from the white list or inputs provisioning data erroneously, whereby provisioning can be performed reliably.

The provisioning device according to the present invention further includes the successive acquiring unit for acquiring unique information successively from the plural field devices by controlling the device information acquiring unit after a start of provisioning for the field devices. Therefore, unlike in the conventional case, it is not necessary to input setting information for provisioning for one field device at a time. Instead, provisioning can be performed on plural field devices automatically and successively. Thus, provisioning can be performed reliably and efficiently.

Furthermore, in the provisioning device according to the present invention, a device tag which is a logical name of a field device and indicates its type and position in a plant can be set automatically in the field device. Therefore, the provisioning device can prevent human errors such as ones caused by manual input as in the conventional case. The provisioning device is thus effective because it can contribute to optimum operation of a plant.

In particular, since a large number of field devices are installed in a plant, the feature that device tags can be set automatically and successively during a provisioning operation is effective because it can prevent human errors and hence contribute to correct setting of field devices when they are installed in a plant.

(Modification 1)

The successive acquiring unit 59 of the provisioning device according to the present invention may be modified so as to select one (e.g., field device 2) of part, not subjected to provisioning yet, of the field devices 2-4 and to control the device information acquiring unit 53 to send a unique information request signal to the selected field device.

In this case, the successive acquiring unit 59 controls the device information acquiring unit 53 until provisioning of all the field device is completed and the device information acquiring unit 53 controls the wireless communication unit 52 so that it sends a unique information request signal to a field device selected by the successive acquiring unit 59 by wireless communication (e.g., infrared communication).

For this reason, in addition to the above configuration, unique information of the plurality of field devices and setting information for provisioning of the plurality of field devices are stored in the while list such that they are correlated with each other. The consecutive acquiring unit is modified so as to select one of part, not subjected to provisioning yet, of field devices to be newly added. As a result, unlike in the conventional case in which provisioning work is performed for one field device at a time, provisioning can be performed on plural field devices automatically and successively. Thus, provisioning can be performed reliably and efficiently.

(Modification 2)

The extracting unit 57 of the provisioning device 5 according to the present invention may be modified so as to extract setting information and a device tag to be set in a field device from the white list based on unique information acquired from the field device. In this case, the setting unit 58 sends the extracted setting information and device tag to the field device by wireless communication and the field device sets the received setting information and device tag in itself With this configuration, a proper device tag can be set in a field device even if a wrong device tag is set therein before provisioning. Thus, provisioning can be performed reliably and efficiently.

(Supplement: Post-Provisioning Operations of Individual Field Devices)

A supplemental description will be made of how the individual field devices 2-4 operate to join the wireless network after completion of provisioning.

To join the wireless network after completion of provisioning, the field devices 2-4 need to be authenticated successfully by a security manager apparatus (not shown).

The security manager apparatus (not shown) authenticates each of the field devices 2-4 that are installed in the wireless network and have been subjected to provisioning using a master key that is generated based on its device identification information (device EUI64) and join key.

The information (device tag, join key, etc.) that are set in each of the field devices 2-4 during a provisioning operation are also set in the security manager apparatus.

For example, to join the wireless network, each of the field devices 2-4 that have been subjected to provisioning sends a master key that is generated from its device identification information and join key the system manager apparatus and the security manager apparatus (neither shown) according to the wireless communication standard ISA 100.11.a or the like and requests them to authenticate it and approve joining of it in the wireless network.

The security manager apparatus (not shown) authenticates each of the field devices 2-4 based on the received master key, and compares the master key received from it with a master key generated by the security manager apparatus itself If they are identical, the security manager apparatus informs the system manager apparatus of that fact.

The system manager apparatus approves joining of each of the field devices 2-4 in the wireless network, and each of the field devices 2-4 connects to the wireless network.

As described above, each of the field devices 2-4 can join the wireless network if authenticated successfully by the security manager apparatus using a master key that is generated from its provisioning setting information.

Second Embodiment

The computation controller 56 of the provisioning device 5 according to the present invention may be modified so as to check, according to check rules stored in the storage unit 55 in advance, whether or not an input white list has redundant data or an erroneous data type. This is effective in preventing occurrence of a human error when a white list is input.

In addition to the above described embodiment, the provisioning device 5 according to the present invention may include an authenticating unit for authenticating a user who attempts to input a white list.

This configuration allows only a particular user (e.g., a manager who manages field workers) to input a white list and thereby enables the particular user to do unified management of white lists. Furthermore, this configuration is effective in eliminating risk that one of many field workers loses a white list.

The computation controller 56 of the provisioning device according to the present invention may be modified so as to cause a white list to contain status information indicating whether a provisioning operation has completed or not ("Done" and "Not yet" shown in FIG. 2) such that it is correlated with provisioning data and a device tag and to store the updated white list in the storage unit 56.

With this configuration, it is not necessary for a maintenance worker to manually input status information of provisioning work, whereby related human errors can be prevented. A manager can check the degree of progress of the whole provisioning work by collecting white lists from field workers, which contributes to management for reliable provisioning work.

Conventionally, provisioning work that is based on white lists is generally performed by the following procedure. (A) A manager who manages all of field devices produces white lists and distributes them to plural field workers as work instruction documents. (B) Each field worker performs provisioning work according to the received white list. (C) Each field worker manually inputs pieces of progress information to the white list after completion of the provisioning work and submits the updated white list to the manager.

In the provisioning device according to the present invention, with the above configuration, occurrence of a human error can be prevented when the manager produces white lists or inputs data to white lists, risk that one of many field workers loses a white list can be eliminated, and occurrence of a human error can be prevented when a field worker manually inputs status information of provisioning work. This configuration is thus effective in contributing to management of the whole provisioning work by a manager.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A provisioning device comprising:
a receiving unit that receives a white list from a user prior to provisioning data being transmitted to a plurality of field devices from the provisioning device, the white list containing unique information of at least a first field device and setting information such that the unique information and the setting information are correlated with each other;
a storage unit that stores the white list acquired through the receiving unit;
a device information acquiring unit that acquires the unique information from the at least first field device by wireless communication;
an extracting unit that extracts, from the white list, the setting information that is correlated with the acquired unique information;
a setting unit that sends the extracted setting information to the at least first field device by wireless communication; and
a successive acquiring unit that acquires the unique information from each of the at least first field devices successively by controlling the device information acquiring unit to output request signals for acquiring the setting information and subsequently transmit to each of the at least first field devices until provisioning for all of the plurality of field devices recorded on the white list is completed, wherein
the receiving unit includes a plurality of slots for electrically connecting with an external storage medium that stores the white list.

2. The provisioning device according to claim 1,
wherein the white list contains unique information of the at least first field devices and setting information for the at least first field devices,
the provisioning device further comprising:
the successive acquiring unit that acquires the setting information from the at least first field devices successively by controlling the device information acquiring unit.

3. The provisioning device according to claim 1, wherein:
the unique information includes type information indicating a type of the at least first field device; and
the extracting unit extracts the setting information from the white list based on the type information.

4. The provisioning device according to claim 1, wherein:
the white list contains the unique information and a device tag indicating a type of the at least first field device and a position of the at least first field device in the plant such that the unique information and the device tag are correlated with each other;
the extracting unit further extracts the device tag from the white list based on the unique information; and
the setting unit sends the extracted setting information and the extracted device tag to the at least first field device by wireless communication.

5. The provisioning device according to claim 1,
wherein the setting information includes at least one of:
a network ID of the at least first field device on the wireless network;
a device address, on the wireless network, of a system manager device that is requested to approve joining of the at least first field device in the wireless network; and
a join key that is used in authenticating the at least first field device when the at least first field device requests joining in the wireless network.

6. provisioning device according to claim 1, wherein:
the unique information includes a device tag indicating a type of the at least first field device and a position of the at least first field device in the plant;
the extracting unit extracts the setting information and the device tag from the white list based on the unique information; and
the setting unit sends the extracted setting information and device tag to the at least first field device by wireless communication.

7. A provisioning device comprising:
a receiving unit that receives a white list from a user prior to provisioning data being transmitted to a plurality of field devices from the provisioning device, the white list containing unique information of at least a first field device and setting information such that the unique information and the setting information are correlated with each other;
a storage unit that stores the white list acquired through the receiving unit; and
a controller that acquires the unique information from the at least first field device by wireless communication; extracts, from the white list, the setting information that is correlated with the acquired unique information; sends the extracted setting information to the at least first field device by wireless communication; and acquires the unique information from each of the at least first field devices successively by outputting request signals for acquiring the setting information and subsequently transmitting to each of the at least first field devices until provisioning for all of the plurality of field devices recorded on the white list is completed, wherein
the receiving unit includes a plurality of slots for electrically connecting with an external storage medium that stores the white list.

8. A method of provisioning for a provisioning device comprising:
receiving a white list from a user prior to provisioning data being transmitted to a plurality of field devices from the provisioning device, the white list containing unique information of at least a first field device and setting information such that the unique information and the setting information are correlated with each other;
storing the white list acquired through the receiving unit;
acquiring the unique information from the at least first field device by wireless communication;
extracting, from the white list, the setting information that is correlated with the acquired unique information;
sending the extracted setting information to the at least first field device by wireless communication; and
acquiring the unique information from each of the at least first field devices successively by outputting request signals for acquiring the setting information and subsequently transmitting to each of the at least first field devices until provisioning for all of the plurality of field devices recorded on the white list is completed, wherein
the receiving includes electrically connecting with an external storage medium that stores the white list.

* * * * *